May 19, 1953  C. SIMON  2,638,883
FUEL DILUTION DEVICE
Filed Dec. 30, 1949
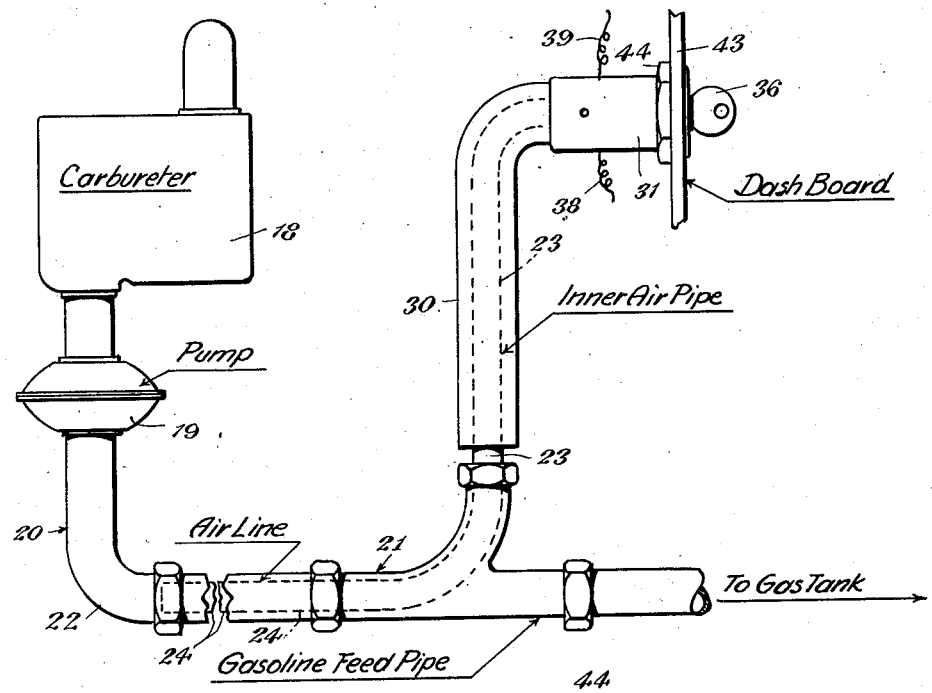
Fig. 1.
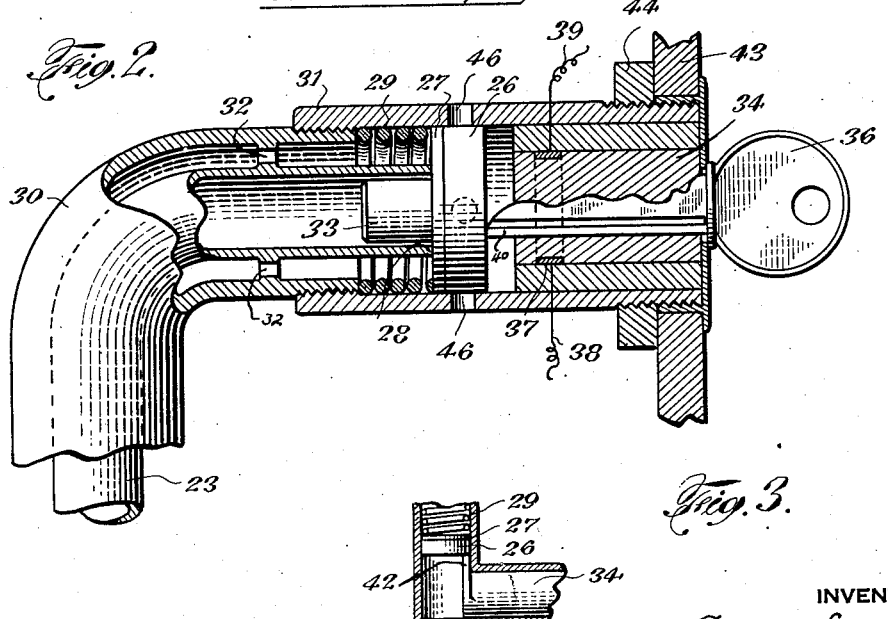
Fig. 2.
Fig. 3.
INVENTOR
CHARLES SIMON
BY
ATTORNEYS Patented May 19, 1953

2,638,883

UNITED STATES PATENT OFFICE 2,638,883

FUEL DILUTION DEVICE

Charles Simon, Lynbrook, N. Y.

Application December 30, 1949, Serial No. 136,099

3 Claims. (Cl. 123—198)

This invention pertains to an improved device to prevent the thieving of automobiles.

More particularly the invention has to do with a unique, simple device preferably inserted in the fuel supply whereby the fuel is cut off from the engine after the engine has been started. Thereafter, the engine cannot again be started unless a certain part of the device has been operated or manipulated.

One of the main features of the invention is to provide an improved apparatus that cooperates with the fuel supply line whereby a diluting medium, such as air or other fluid, or liquid, will be bled into the fuel line in such quantity that the engine will soon stop.

Further, another main feature of this improved invention is to provide a novel type of valve structure which, usually is subject to key operation, and to have the valve control the operation of the novel apparatus of the device so as to have the diluting material or air reach the engine instead of the fuel.

Another feature of the improved invention is to provide a simple apparatus to be attached to the fuel supply of an automobile at some point between the carburetor and the fuel tank and to have it automatically operate to stop the engine of the automobile within a reasonable distance from its parked position.

Another feature of the invention includes the combining of the locking means forming part of the improved apparatus with the electrical ignition system so as to have them cooperate to open or close the ignition circuit to the engine at the same time the anti-theft device is manipulated.

Preferably, it is desired to insert part of the apparatus in the fuel supply line between the fuel pump and the fuel tank, and to assemble another portion of the apparatus, such as a valve, at a point in the automobile that is convenient to the operator, or it may be positioned at some part of the car that is less likely to be noticed or found, or it may be mounted in the glove compartment and thereby be subject to a key lock of its own and to the lock of the glove compartment.

In the simplest form the improved device consists of a tap into the fuel line, and a pipe connection to a valve, which may be closed or may be open to the atmosphere and allow air to be pulled into the carburetor. Also, the improved apparatus provides for several different air openings, leads or entrances to the pipe to the valve so that air still will be bled into the fuel line even though one or more of the leads may be purposely blocked up. The valve in its normal position will close the air bleeding line so that fuel will be pumped in normal fashion to the carburetor.

If the automobile has been started and moved by the thief, the engine will soon go dead and he will not be able to start it without finding and operating the valve, and in some instances, he will have to add some gasoline to the carburetor.

Other features and advantages of the invention will be appreciated from the reading of the detailed description which follows, and wherein Fig. 1 is an assembly view in diagrammatic form of the improved apparatus as included in a fuel system of a power unit;

Fig. 2 is an enlarged view partly in section of a valve operating part of the device along with a lock and key for operating the valve and for controlling the ignition system; and Fig. 3 is a view partly in section of a modified structural means for closing the valve.

Referring now in detail to the drawings wherein a preferred installation of this improved device is shown, a carburetor 18 and pump 19 of an automobile fuel system are shown in diagrammatic form in the gasoline supply line 20, in which a joint 21 is provided in pipe 22 that leads to a gas tank, not shown. A secondary piping 23 is shown connected to the joint 21 and is provided with an elongated extension 24 mounted in the pipe 22 and extending toward the engine and functions to allow a suitable fuel diluting material to flow or be pulled into the fuel supply line 20 under certain operating conditions. The secondary piping 23 preferably extends upwardly to a point in height which is usually higher than the top of the carburetor and than the top of the gas supply tank (not shown). A valve 26 with a gasket 27 is provided to close over the end 28 of the secondary piping 23. This valve functions to close off or to permit air, as a fuel diluting material, to be drawn down through the secondary piping into pipe 24 and into pipe 22 by the operation of pump 19, thereby diluting the fuel so that the carburetor would allow the air to pass to the internal combustion engine or power unit and the fuel would be so diluted or only be air that the engine would stop. While air has been noted as one fuel diluting material, materials such as fluids or liquids may be employed.

It is desirable to provide such a type of valve 26 that is biased in one direction such as by spring 29, and in this instance, the biasing is to automatically maintain the valve open so that air may freely pass into the secondary piping 23. Any type of structure may be employed to suitably admit air to the secondary piping 23, and a suitable extension is incorporated with the valve for this purpose. Such an extension may take the form of a pipe extending beyond the valve to the right, or may take the form of an enclosing piping 30, as shown, which surrounds the secondary piping for a desired length. This enclosing piping may or may not have some holes or various shaped openings formed in it.

For the purpose of most easily supporting the valve and controlling its movements, a frame 31 is provided with screw threads to engage the enclosing piping 30. An open frame work 32 is provided for properly mounting the enclosing piping 30 on the secondary piping 23. Other types of such open-work frames may be employed, if desired, and may be positioned in advantageous locations. In assembling the valve and the secondary piping 23, it is desirable in the illustrative form to have spring 29 positioned between the end of the enclosing piping 30 and the gasket 27. A knob 33 is carried by the valve 26 for the purpose of maintaining and guiding valve 26 in proper relation to secondary piping 23 during the movements of the valve.

Also mounted in the frame 31 and positioned to cooperate with the valve 26 is a lock mechanism provided with a lock tumbler 34 and a key 36, both of which are arranged to have definite type of cooperating high and low points so that the tumbler 34 can only be oscillated or unlocked when the cooperating key 36 is inserted. The tumbler 34 carries a partially annular length of an electrical conducting band 37 which properly connects electrical leads 38 and 39 when the lock tumbler has been turned to ignition position.

It is also desirable to provide a suitable means for closing the valve 26 when the ignition system is closed, and in one form thereof an extension 40 is provided on key 36 so that as the key is pushed into posiiton to be able to turn tumbler 34, it will push valve 26 and cause gasket 27 to close over the end 28 of the secondary piping, thereby closing all air inlets to the secondary piping. The provision of extension 40 and key 36 constitutes one manner in which the valve can be automatically closed to prevent the diluting material, such as air, from reaching the fuel of the system. The structure of the apparatus in Fig. 2 shows the valve 26 seated over the end 28 of the secondary piping.

In other instances it may be desirable to provide an offcenter means of closing the valve 26 and Fig. 3 illustrates such a modified type of structure in diagrammatic form. In the showing in Fig. 3 the lock tumbler 34 is shown as extended and as having on its end a cam-like structure 42 so that as the tumbler 34 is oscillated by key 36, the cam 42 will push the valve 26 into closed position. The structure in this Fig. 3 prevents an unauthorized person from forcing a modified type of key into tumbler 34 and against valve 26 for pushing the same to closed position.

It will be noted in Fig. 2 that the frame 31 in the one position of installation is mounted on dash 43 and held there by a suitable nut 44. Another position of the frame 31 is to have it inserted in the wall of the glove compartment of the automobile and thereby employ the lock tumbler 34 as one locking means and employ the glove compartment lock as a second locking means, thus to prevent an unauthorized person from manipulating valve 26. It will be understood that the lock with its tumbler 34 and key 36 may be installed at any convenient place around the operator but usually somewhere within fairly ready reach.

When the valve 26 is open, it extends to the right from its position shown in Fig. 2 so that suitable openings 46 will allow air to be sucked into the secondary piping 23 along with the air which passes through the enclosing piping 30. Such a construction permits the flow of air into secondary piping 23 even though one or more openings may be clogged or plugged for any reason. Any other alternative structure may be employed so long as it provides several openings for the air at different places.

With this improved type of preferred construction of device for preventing thieving, it will be noted that the valve 26 will automatically be open when key 36 is removed and while there will be some fuel in the pump and in the carburetor, the unauthorized person may be able to start the engine, but air will soon be drawn into the fuel pipe line and will so dilute the fuel that the engine will stop. Thus, while an unauthorized person may "bridge" an electrical ignition system and start the engine, that engine will continue in operation for only a short period of time before the air so dilutes the fuel that the engine stops. It will be noted that it will be difficult for the unauthorized person to be able to close the valve 26 even though he is able to close the electrical ignition circuit by "bridging" it.

It will also be understood that the ignition circuit may be separately operated and not necessarily incorporated in the lock tumbler structure. In such a case, the operator would need two keys for operating the automobile. This would be an added deterrent to the unauthorized person.

It will be further noted that with this improved fuel dilution device, a quick ready operating mechanism will prevent the theft of an automobile. It will also be noted that the device is simple in construction and of only a few number of parts to accomplish the desired advantages.

It will be understood that various modifications and changes may be made in the preferred form of the invention herein, and such modifications and changes are to be understood as being part of this invention, as outlined in the following claims.

The invention claimed is:

1. In an automobile, the combination of a carburetor, a fuel supply, a pipe between said carburetor and said supply, a pump for moving fuel from said supply to said carburetor, a joint in said pipe, a secondary piping leading through said joint into said first pipe and extending to a point higher than said carburetor, an automatically opened valve in said second piping to admit air into said fuel pipe, and means for closing said valve to prevent air from reaching said carburetor.

2. In an automobile the combination of a carburetor, a fuel supply, a pipe between said carburetor and said fuel supply, a secondary piping connected to said first pipe, a spring pressed valve mounted in said secondary piping and automatically pressed to open position, a frame for holding said valve and allowing its movement therein, a sleeve over said secondary piping for admitting air through said sleeve and through said valve into said secondary piping and into said fuel supply pipe, an ignition switch mechanism positioned and held in the same frame with said valve, and a key lock for closing said ignition circuit, said key having an extension to push said valve to closed position before said key can be operated to close said ignition circuit.

3. In an automobile, the combination of a carburetor for vaporizing fuel to an internal combustion engine, a liquid fuel supply, a pipe between said carburetor and said fuel supply, a pump in said pipe for moving the fuel through said pipe, a joint in said pipe with an extension therein extending part way along in said pipe toward said pump, a secondary piping connected to said joint and extending to a position in said automobile higher than said carburetor and said fuel supply, a spring pressed valve mounted at the end of said secondary piping, said valve normally being open, a frame for holding said valve in movable position in relation to said secondary piping, said frame having openings leading to said secondary piping, an enclosing piping around said secondary piping to admit air to said secondary piping, a key tumbler lock held in said frame, said tumbler having a cam-like extension for engaging said valve, and a key for turning said tumbler and forcing said valve to close all air inlets to said secondary piping and to maintain them closed during operation of the automobile.

CHARLES SIMON.

References Cited in the file of this patent

UNITED STATES PATENTS

| Number | Name | Date |
|---|---|---|
| 1,000,523 | Illsley | Aug. 15, 1911 |
| 1,294,328 | Bowden | Feb. 11, 1919 |
| 1,379,292 | Szameit | May 24, 1921 |
| 1,582,528 | Michael | Apr. 27, 1926 |
| 2,059,688 | Gamage et al. | Nov. 3, 1936 |

FOREIGN PATENTS

| Number | Country | Date |
|---|---|---|
| 773,014 | France | Nov. 10, 1934 |